United States Patent
Williams et al.

(10) Patent No.: US 8,031,197 B1
(45) Date of Patent: Oct. 4, 2011

(54) PREPROCESSOR FOR FORMATTING VIDEO INTO GRAPHICS PROCESSING UNIT ("GPU")-FORMATTED DATA FOR TRANSIT DIRECTLY TO A GRAPHICS MEMORY

(75) Inventors: Ian M. Williams, Menlo Park, CA (US); Dat T. Nguyen, Santa Clara, CA (US); Lauro B. Mañalac, San Jose, CA (US); Thomas J. True, Los Gatos, CA (US)

(73) Assignee: Nvidia Corporation, Santa Clara, CA (US)

( * ) Notice: Subject to any disclaimer, the term of this patent is extended or adjusted under 35 U.S.C. 154(b) by 420 days.

(21) Appl. No.: 11/346,665

(22) Filed: Feb. 3, 2006

(51) Int. Cl.
*G06T 1/00* (2006.01)
(52) U.S. Cl. ....................................................... 345/501
(58) Field of Classification Search .................. 345/546, 345/610, 501
See application file for complete search history.

(56) References Cited

U.S. PATENT DOCUMENTS

| | | | | |
|---|---|---|---|---|
| 5,243,447 A * | 9/1993 | Bodenkamp et al. | ......... | 345/629 |
| 5,432,900 A * | 7/1995 | Rhodes et al. | ............... | 715/202 |
| 5,506,604 A * | 4/1996 | Nally et al. | .................. | 345/603 |
| 5,903,281 A * | 5/1999 | Chen et al. | .................... | 345/504 |
| 5,912,676 A * | 6/1999 | Malladi et al. | ............... | 345/531 |
| 5,943,064 A * | 8/1999 | Hong | ............................. | 345/546 |
| 6,023,302 A * | 2/2000 | MacInnis et al. | ............. | 348/597 |
| 6,240,516 B1 * | 5/2001 | Vainsencher | ................. | 713/190 |
| 6,466,226 B1 * | 10/2002 | Watson et al. | ................ | 345/610 |
| 6,614,441 B1 * | 9/2003 | Jiang et al. | ..................... | 345/539 |
| 6,847,365 B1 * | 1/2005 | Miller et al. | ................... | 345/502 |
| 2003/0160792 A1 * | 8/2003 | Alcorn | .......................... | 345/502 |
| 2003/0174244 A1 * | 9/2003 | Nakata | .......................... | 348/441 |
| 2003/0195998 A1 * | 10/2003 | Estrop | ........................... | 709/323 |
| 2003/0215017 A1 * | 11/2003 | Fang | ........................ | 375/240.25 |
| 2007/0067535 A1 * | 3/2007 | Liu | ............................... | 710/300 |

* cited by examiner

*Primary Examiner* — Xiao M. Wu
*Assistant Examiner* — Edward Martello
(74) *Attorney, Agent, or Firm* — Cooley LLP

(57) ABSTRACT

Disclosed are a GPU video data preprocessor, a computer device, an apparatus and a method for facilitating expeditious video transfer to graphics memory for enhancing display and video capture applications, among other things. In one embodiment, a graphics preprocessor is used to preprocess video for transit via a graphics processing unit ("GPU") directly to graphics memory without invoking a graphics driver. The graphics preprocessor includes an input configured to receive video data. It also includes a native data formatter coupled to the input and configured to format the video data as GPU data to conform with the architecture of the GPU. In at least one embodiment, the graphics preprocessor also includes a command execution unit, which can be configured to transmit an instruction executable by the GPU as a transmitted instruction to perform a graphics pipeline operation on the GPU data.

13 Claims, 7 Drawing Sheets

PREPROCESSOR FOR FORMATTING VIDEO INTO GRAPHICS PROCESSING UNIT ("GPU")-FORMATTED DATA FOR TRANSIT DIRECTLY TO A GRAPHICS MEMORY

BRIEF DESCRIPTION OF THE INVENTION

This invention relates generally to computing devices and graphics processing units, and more particularly, to a GPU video data preprocessor for formatting video into GPU-formatted data useable by a GPU and for transporting the GPU-formatted data via a communications path that excludes, for example, system memory. In one embodiment, the communications path reduces an amount of resources used to either perform graphic operations on video (e.g., prior to display) or to capture video.

BACKGROUND OF THE INVENTION

Video creators are increasingly using graphics processing units ("GPUs") and their graphics memory (e.g., frame buffers) to facilitate streaming of video from an external video source to the graphics memory. GPUs are high-performance three-dimensional ("3D") processors that include 3D graphics pipelines to perform graphics operations, such as transformations, lighting, setup, rendering and the like. An example of one type of external source of video generates video compatible with the Standard Definition Serial Digital Interface ("SD-SDI") and/or High Definition Serial Digital Interface ("HD-SDI") standards, as maintained by the Society of Motion Picture and Television Engineers ("SMPTE"). Professional video creators and the television broadcasters use these standards, such as SMPTE 259M, to create high-quality video images. The video is loaded into graphics memory so that it can be either scanned out to a display or captured (i.e., video captured) into a storage medium, such as a disk. Traditionally, video input cards convert the input video stream into a format useable by a central processing unit ("CPU"). While functional, conventional video input cards have several drawbacks in using graphics memory to display and capture the video.

FIG. 1 is a block diagram representative of traditional techniques for both storing video into graphics memory and performing graphics-related operations on the video data to modify the video image. As shown, computing device 100 includes graphics memory 102, a graphics processing unit ("GPU") 104, a central processing unit ("CPU"), and system memory 120. In operation, video input card 106 receives digitized video ("video in") 107, such as in SDI format. Converter logic 108 of video input card 106 then converts the SDI format into a format that is suitable for use by CPU 110 and system memory 120. For instance, converter logic 108 converts digitized video 107 from one color space (e.g., YCrCb) to another (e.g., RGB) and converts interlaced video into non-interlaced video.

The traditional technique of storing video in graphics memory includes sending digitized video 107 over a path that includes numerous devices and/or processing steps, each of which adds delay to the transference of video. Sending digitized video 107 over a path having numerous delays requires complex coordination of the video transfer, especially for real-time video. As shown, computing device 100 requires digitized video 107 to traverse path 144 to system memory 120, which includes a number of various layers 150. CPU 110 executes instructions from an application program in application layer 130 to initiate the video transfer to the lower layers. Next, an applications program interface ("API") layer 132 translates the instructions for transferring digitized video 107 down through the operating system ("O/S") 134 to a graphics driver 136. To do so, APIs in the API layer 132 communicate with a library 160, which contains precompiled routines for translating commands from the application program and GPU-specific instructions. Note that accessing library 160 adds delay. Graphics driver 136 then provides abstract commands for one or more push buffers 138, each of which provides an interface between software and hardware. As such, graphics driver 136 typically inserts GPU commands and data into push buffer 138 and then initiates transportation of the GPU commands and data via path 142 to graphics memory 102.

There are several drawbacks to transferring data to graphics memory 102 over paths 142 and 144. First, graphics driver 136 inserts digitized video 107 into data frames in a format that is generally not compatible with the native data format associated with the architecture of GPU 104. Incompatibilities with the native data format generally results in inefficiencies since suboptimal amounts of digitized video 107 are usually transferred with the format set by push buffer 138. This decreases throughput and exacerbates delays. Second, computational resources of computing device 100, such as CPU 110 and system memory 120, are integral in facilitating the data transfer. As such, CPU 110 and system memory 120 therefore must allocate their resources to perform the data transfer via layers 150 rather than other tasks. This hinders performance of computing device 100 when performing those other tasks. Third, the translation of video data from application layer 130 to push buffer 138 injects spurious delays that require precise synchronization of the data transfer, especially when digitized video 107 is real-time high-definition video. Moreover, the translation is also dependent on CPU 110 having CPU cycles to devote to the video transfer.

Responsive to execution of an applications program, CPU 110 interacts via path 140 with GPU 104 to access graphics memory 102 when performing a graphics-related operation on the video data. Examples of such graphics operations include color corrections, color conversions (e.g., expand or reduce the color depth), color space conversions, bit reordering (e.g., reordering RGB into BGRA, where "A" indicate "alpha"), alpha filtering, and any other graphics-related operation. One drawback to performing graphics-related operations on digitized video 107 is that computational resources of computing device 100, including CPU 110, are again tasked, in whole or in part, with modifying video images. So if CPU 110 is being tasked to perform a higher priority task, then the graphics-related operation may be delayed. Another drawback is that the performance capabilities of CPU 110 (e.g., operational speed) and/or system memory 120 (e.g., access times) govern the rate at which graphics-related operations occur as well as the rate at which digitized video 107 is transferred. Consequently, other higher priority tasks and the suboptimal capabilities of the hardware can detrimentally influence video being loaded into graphics memory 102.

In view of the foregoing, it would be desirable to provide a GPU video data preprocessor, a computer device, an apparatus and a method that minimizes the above-mentioned drawbacks, thereby facilitating expeditious video transfer to graphics memory for enhancing display and video capture applications, among others.

SUMMARY OF THE INVENTION

Disclosed are a GPU video data preprocessor, a computer device, an apparatus and a method for facilitating expeditious video transfer to graphics memory for enhancing display and video capture applications, among other things. In one embodiment, a graphics preprocessor is used to preprocess video for transit via a graphics processing unit ("GPU") directly to graphics memory without invoking a graphics driver. The graphics preprocessor includes an input configured to receive video data. It also includes a native data formatter coupled to the input and configured to format the video data as GPU data to conform to the architecture of the GPU. In at least one embodiment, the graphics preprocessor also includes a command execution unit, which can be configured to transmit an instruction executable by the GPU as a transmitted instruction to perform a graphics pipeline operation on the GPU data. In at least one embodiment, the GPU video data preprocessor need not invoke an applications programming interface ("API").

In another embodiment, a method loads video from an external source to a computing device that includes one or more graphics processing units ("GPUs"). The video is streamed into a graphics memory without invoking an applications programming interface ("API"). The method includes formatting video data representing the video to form GPU-formatted video data in a native format useable by the one or more GPUs. The method also includes storing the GPU-formatted video data in the graphics memory. In a specific embodiment, the method can further include adapting the video data to conform to an instruction set architecture of the one or more GPUs.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1:
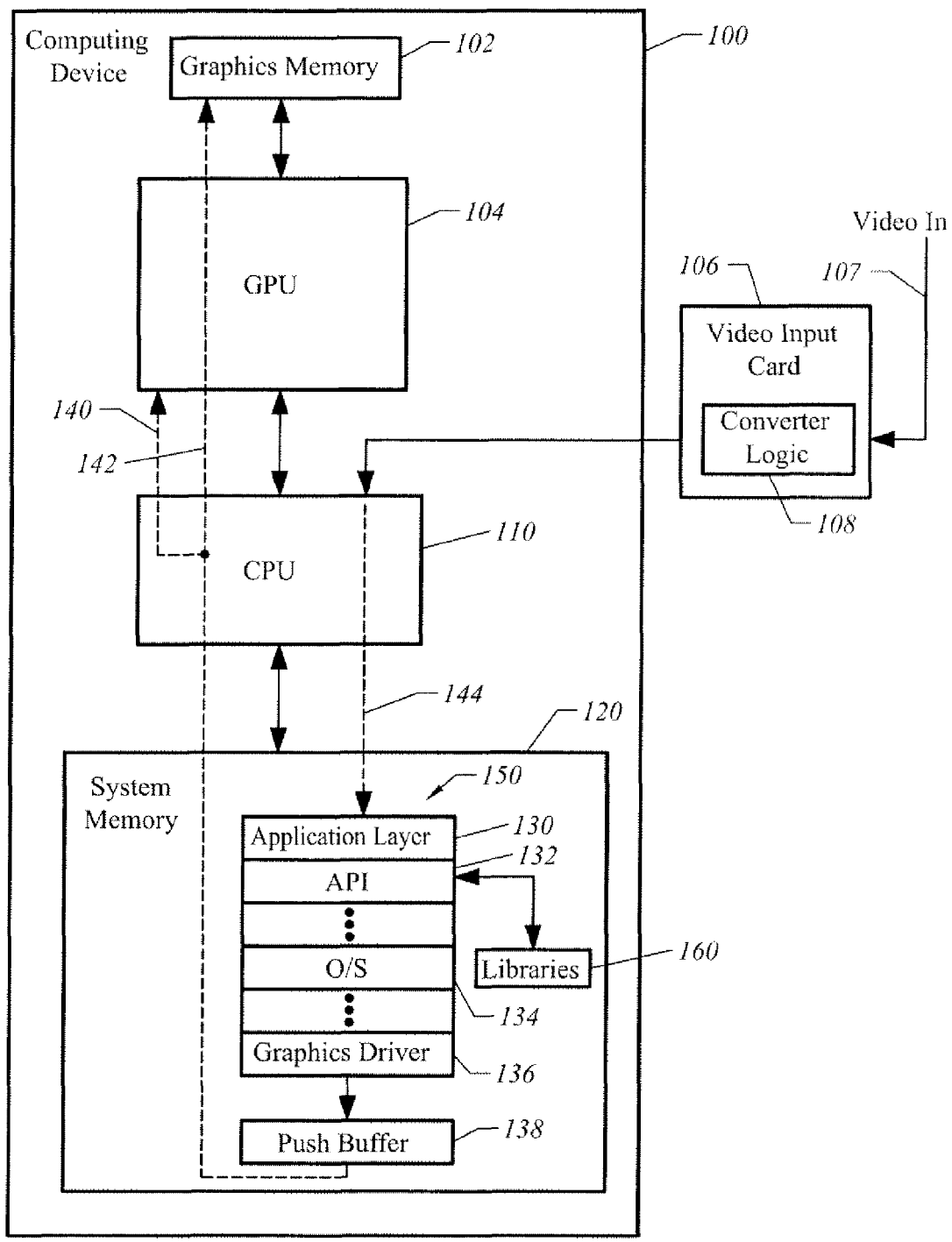
FIG. 1 is a block diagram representative of traditional techniques for both storing video into graphics memory and performing graphics-related operations on the video data to modify the video image.
Figure 2:
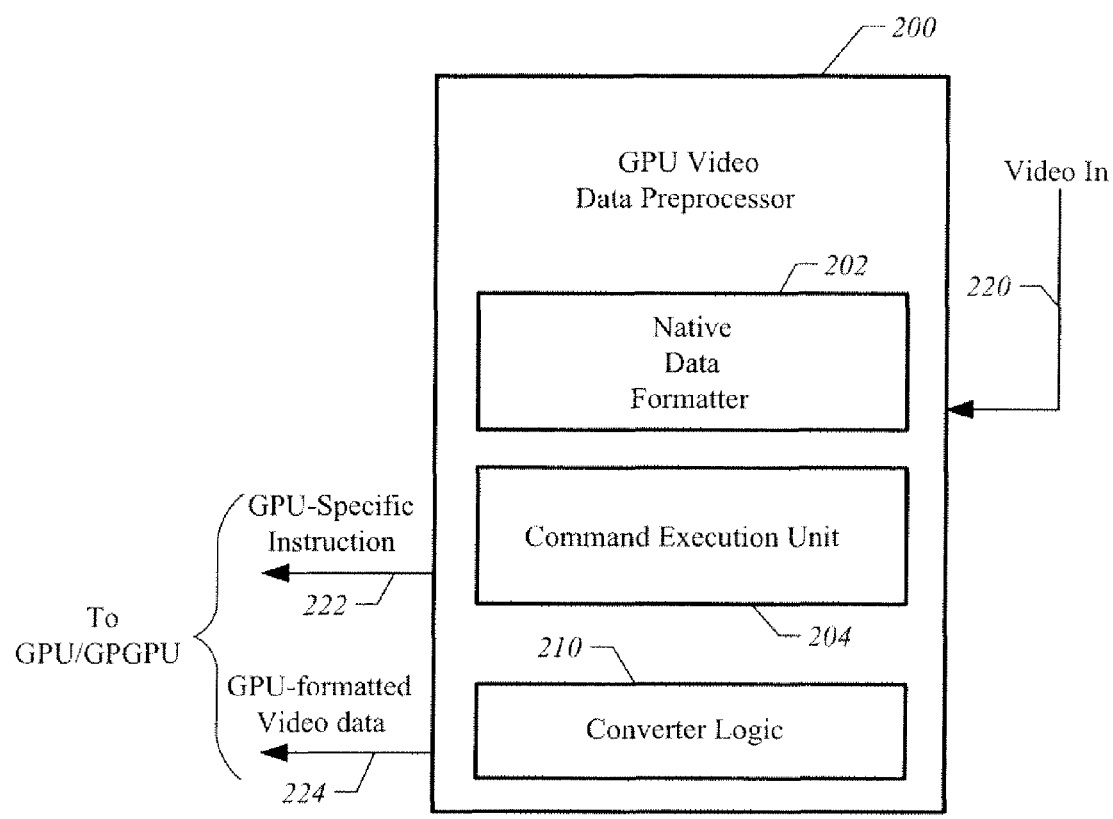
FIG. 2 is a block diagram of a graphics processing unit ("GPU") video data preprocessor for processing video prior to transit via the GPU to graphics memory, according to at least one specific embodiment of the invention.

FIG. 2 is a block diagram of a graphics processing unit ("GPU") video data preprocessor for processing video prior to transit via the GPU to graphics memory, according to at least one specific embodiment of the invention. In particular, GPU video data preprocessor 200 transmits video directly to graphics memory without invoking a graphics driver. As shown, GPU video data preprocessor 200 includes an input ("video in") 220 for receiving video data from an external source (not shown), and a native data formatter 202 for formatting the video data into a native format to conform with the architecture of the GPU (not shown). Video data in a native format is described as GPU data ("GPU-formatted video data") 224. As used herein, the term "native format" in some embodiments refers to a data format that aligns with the architecture of the GPU, including the instruction set architecture. For example, a native format aligns video data to form GPU data so that it has the same or nearly the same bit width as does a graphics pipeline in the GPU. As another example, a native format can be the number of bits of an operand reserved for video data, where the operand is a native instruction of the GPU. In a specific embodiment, GPU video data preprocessor 200 can also include a command execution unit 204, which is configured to transmit an instruction to the GPU. Generally, the instructions is a GPU-Specific instruction 222. Further, GPU video data preprocessor 200 can include converter logic 210 for performing, for example, color space conversion from a color space associated with the video data at input 220 into another color space that is useable by the GPU. GPU video data preprocessor 200 can also process video-related data according to various embodiments of the invention. Video-related data are ancillary data that accompany or supplement the video data, examples of which include data for implementing closed captioning as well as audio data embedded in the video signal received at input 220.

As GPU video data preprocessor 200 need not invoke a graphics driver, it can transport video from the external source to graphics memory without requiring a computing device to expend computational resources, such as a central processing unit ("CPU") or a system memory, to support the transportation of video data. Namely, GPU video data preprocessor 200 can form a communications path extending to graphics memory without including either a CPU or a system memory in the path. Thus in some embodiments, GPU video data preprocessor 200 forms a "direct" path to graphics memory, where the term "direct" describes a communications path that excludes at least either the CPU or the system memory, or both. Moreover, the GPU video data preprocessor of some embodiments need not invoke an applications programming interface ("API") that is stored, for example, in the system memory. Advantageously, the communications path reduces latency in storing video data in the graphics memory that otherwise accompanies transferring video data from, for example, system memory. In addition, native data formatter 202 increases throughput from video input 220 to the graphics memory by formatting the video data as GPU data unlike some conventional approaches in which a push buffer is used to send video. Video data sent via a push buffer is generally not aligned with the architecture of the GPU, thereby giving rise to suboptimal video data throughput. Further, command execution unit 204 can be used to instruct a graphics pipeline to perform a graphics-related operation to modify an image while it streams (or after it streams) through the graphics pipeline on its way to graphics memory for storage. Command execution unit 204, therefore, provides at least one benefit, such as conserving computational resources of either a CPU or another GPU that otherwise would be consumed to perform the graphics-related operation on the video data.

Figure 3:
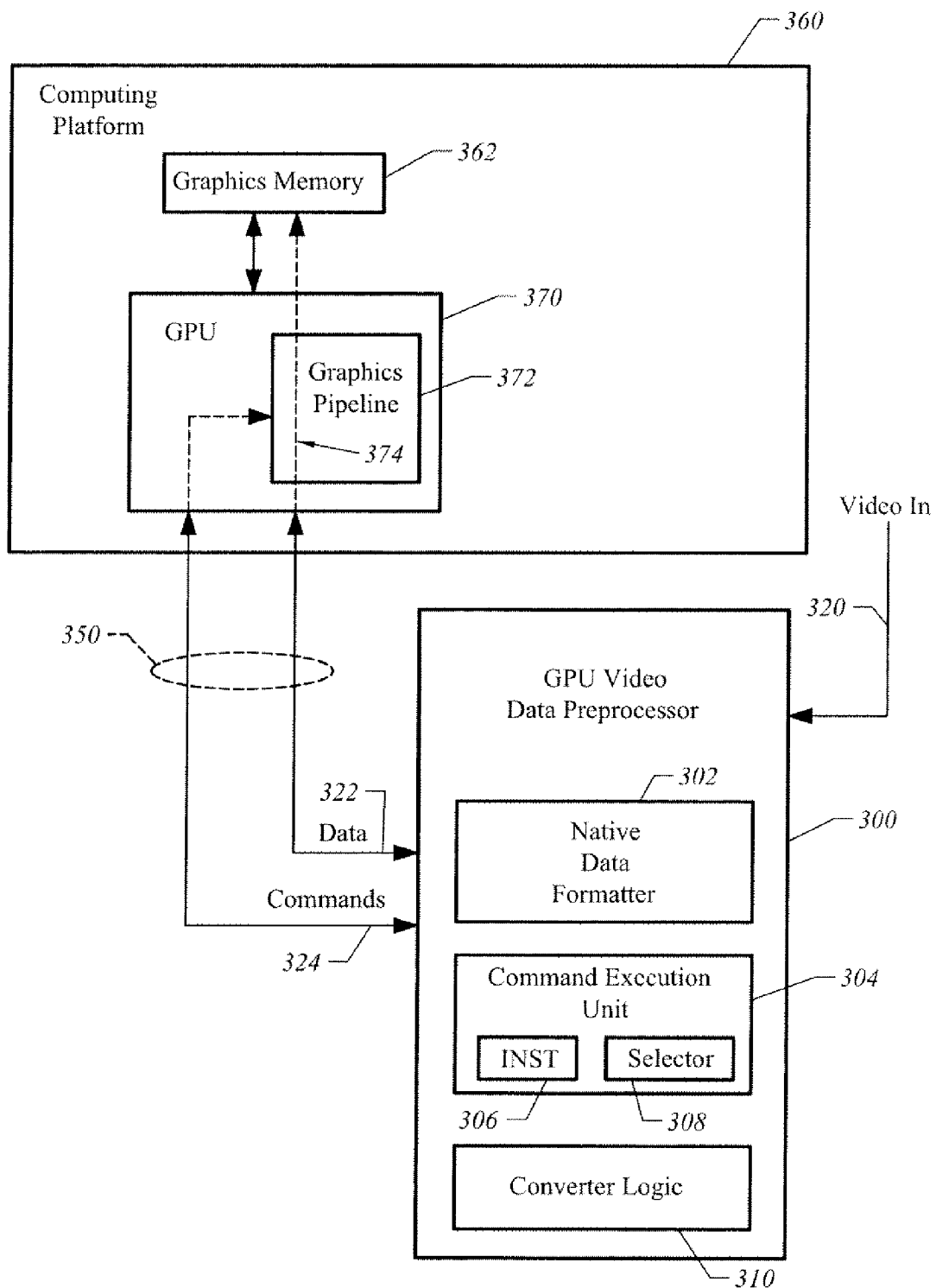
FIG. 3 depicts a GPU video data preprocessor forming a communications path with graphics memory, according to one embodiment of the invention.

FIG. 3 depicts a GPU video data preprocessor forming a communications path with graphics memory, according to one embodiment of the invention. As shown, GPU video data preprocessor 300 is coupled via a communications path 350 to graphics memory 362. In one embodiment, communications path 350 includes a graphics pipeline 372 within a GPU 370. GPU 370 and graphics memory 362 reside in a computing platform 360, which can be a computing device, a motherboard, or the like. Generally, computing platform 360 also includes a CPU and a system memory, both of which are not shown. GPU video data preprocessor 300 includes a native data formatter 302, a command execution unit 304 and converter logic 310, each having a structure and/or functionality, in whole or in part, of similarly named elements in FIG. 2.

To illustrate the operation of GPU video data preprocessor 300, consider the following example. High definition video is applied to a video ("in") input 320 as a High Definition Serial Digital Interface ("HD-SDI") video data signal. Converter logic 310 operates to convert the video data from, for example, a YCrCb color space to an RGB color space. Next, native data formatter 302 formats the video data into a native format as GPU data 322 (i.e., GPU-formatted video data) to conform to at least the architecture of GPU 370. In one embodiment, native data formatter 302 forms units of GPU data 322, with each of the units being in a native format for GPU 370. The size (e.g., the number of bits) of each unit is configured to align, for example, with the native widths of a graphics data bus 374 in graphics pipeline 372. As such, the amount of video data being transmitted into graphics memory 362 is more than if a graphics driver was the originator of the video data. Normally, graphics drivers send the video data in discrete parts that are typically smaller in size than the native format, thereby reducing the video throughput from the video input to graphics memory. In another embodiment, native data formatter 302 can arrange the video data into a graphics-friendly arrangement. For example, consider that GPU 370 customarily receives video data in the following order: B-G-R-A, where B represents blue pixel data being sent first, followed by green ("G") pixel data, red ("R") pixel data, and then alpha data, where A represents the alpha filtering value. Next, consider that converter logic 310 provides RGB pixel data in the following order: R-G-B, from first produced to last produced. Native data formatter 302 therefore can rearrange the R-G-B arrangement of pixel data to provide the graphics-friendly arrangement of B-G-R-A. In other embodiments, native data formatter 302 can be configured to format, arrange and otherwise process video data from video input 320 to conform the video data to the structure and/or functionality of GPU 370 for expediting storage in graphics memory 362.

To further illustrate the operation of GPU video data preprocessor 300, consider that command execution unit 304 includes one or more GPU-specific instructions in an instruction repository ("INST") 306 that are executable by GPU 370 as commands. Command execution unit 304 also includes an instruction selector ("selector") 308 for selecting which of the one or more GPU-specific instructions are to be sent as commands 324 to GPU 370. At least one of the instructions from instruction repository ("INST") 306 is configured, for example, to modify an image composed of GPU data 322 during passage through graphics pipeline 372. As a first example, instruction selector 308 can transmit command 324 as an instruction to perform color correction on GPU data 322 in graphics pipeline 372 prior to storage in graphics memory 362. As a second example, command 324 can be an instruction to configure graphics pipeline 372 to treat GPU data 322 as texture streaming to graphics memory 362. As a third example, command 324 can be a blit instruction or any other type of data-transfer instruction, where a blit instruction causes GPU 370 to copy blocks of bits from one part of graphics memory 362 to another part of memory (or to another graphics memory—not shown). This type of instruction can be used to determine what is to be rendered on a computer display (not shown). As a fourth example, command 324 can be an instruction to wake-up or to re-initialize GPU 370. In one embodiment, instruction selector 308 selects an instruction in response to an application executed by a processor, such as a CPU. In a specific embodiment, GPU 370 is a general purpose GPU ("GPGPU").

Figure 4:
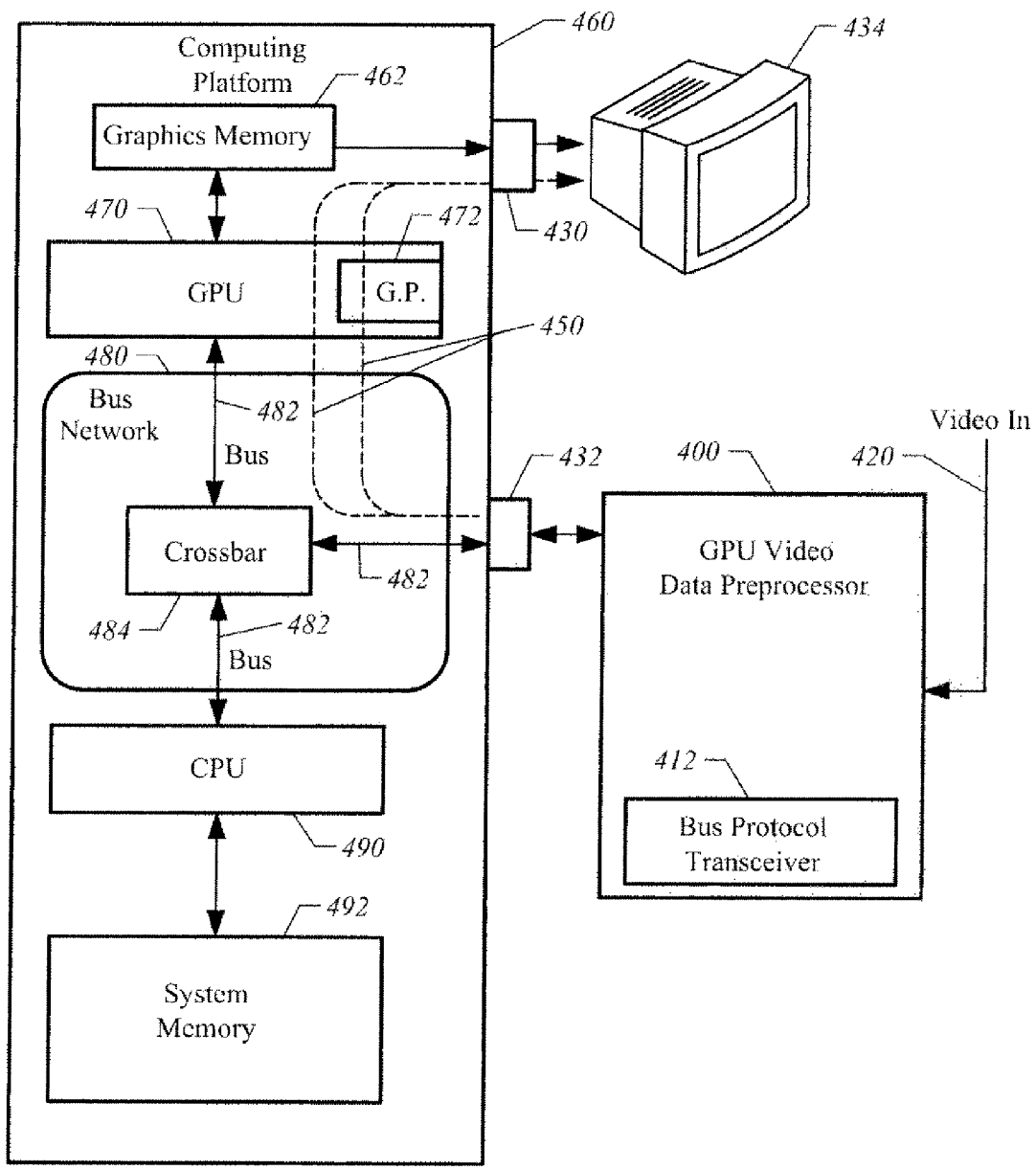
FIG. 4 depicts a GPU video data preprocessor coupled to a bus network to form a communications path with graphics memory, according to an embodiment of the invention.

FIG. 4 depicts GPU video data preprocessor coupled to a bus network to form a communications path with graphics memory, according to an embodiment of the invention. As shown, GPU video data preprocessor 400 is coupled via a bus connector 432 to computing platform 460. Computing platform 460 includes a graphics memory 462, a GPU 470, a bus network 480, a CPU 490 and a system memory 492. Computing platform 460 also includes a display port 430 for coupling computing platform 460 to a display 434, whereby display port 430 facilitates streaming video from video input ("video in") 420 to display 434. Computing platform 460 provides for communications path 450, which extends from GPU video data preprocessor 400 and passes directly to graphics memory 462 through bus connector 432, bus network 480, GPU 470. Optionally, communications path 450 can pass through graphics pipeline ("G.P.") 472.

Bus network 480 includes a number of buses 482 for conveying signals and a crossbar 484 for multiplexing those signals among CPU 490, system memory 492, and GPU 470 each other via buses 482. Crossbar 484 provides switched point-to-point connections and thus enables GPU video data preprocessor 400 to communicate directly to GPU 470 without relying on CPU 490. GPU video data preprocessor 400 includes a bus protocol transceiver 412 configured to transmit and/or receive data, such as the GPU data and commands, with bus network 480. In a specific embodiment, bus network 480 is based on a PCIe bus architecture and bus protocol transceiver 412 is configured to operate in accordance with the PCIe bus protocol. PCIe, or PCI Express, is a bus architecture and protocol defined in a specification maintained by the Peripheral Component Interconnect Special Interest Group ("PCI-SIG"). In one embodiment, crossbar 484 is an integrated circuit formed to function as a PCIe bridge. In a specific embodiment, GPU video data preprocessor 400 is form as integrated circuit, such as a Field Programmable Gate Array ("FPGA") device and can mounted on a printed circuit board ("PCB"). In an embodiment, bus connector 432 is a PCI Express slot.

Figure 5:
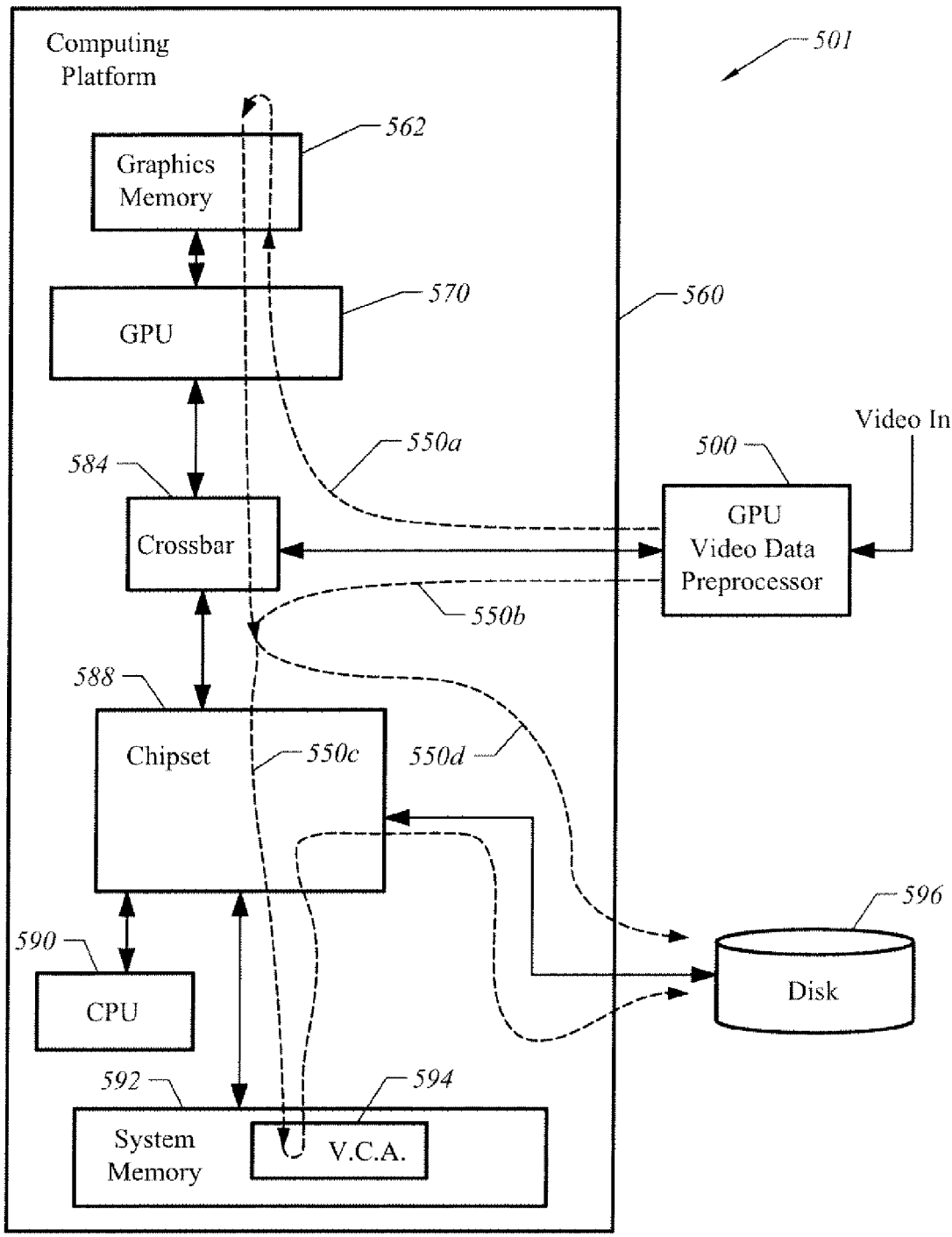
FIG. 5 depicts a GPU video data preprocessor coupled to a computing platform to establish a communications path to a storage medium for capturing video, according to an embodiment of the invention.

FIG. 5 depicts GPU video data preprocessor coupled to a computing platform to establish a communications path to a storage medium for capturing video, according to an embodiment of the invention. As shown, a video capture system 501 includes a GPU video data preprocessor 500 coupled to a computing platform 560. Computing platform 560 includes a graphics memory 562, a GPU 570, a crossbar 584, a chipset 588, a CPU 590 and a system memory 592. Computing platform 560 also is coupled to a storage medium, such as disk 596, to which the video data is captured. Chipset 588 can be one or more integrated circuits providing Northbridge and/or Southbridge functionality. In some cases, chipset 588 conceptually is a PCIe controller that controls inputs and outputs with respect to, for example, CPU 590. System memory 592 includes a video capture applications program ("VCA") 594 for facilitating some implementations of video capture in accordance to various embodiments of the invention.

Video capture system 501 can be configured to provide a first communications path including path segments 550a and 550d. That is, the first communications path passes through crossbar 584 and GPU 570 for optional storage in graphics memory 562. The first communications path continues from GPU 570 through both crossbar 584 and chipset 588 to disk 596. Further, video capture system 501 can be configured to provide a second communications path that includes path segments 550b and 550d. The second communications path passes through both crossbar 584 and chipset 588 to disk 596. A third communications path includes path segments 550a and 550c. The first leg (i.e., path segment 550a) of the third communication path passes through similar elements, as does the first communications path. But the second leg (i.e., path segment 550c) passes through system memory 592, video capture applications program 594 and chipset 588 to disk 596. Note that while the first and second communications paths can be considered "direct" as they exclude CPU 590 and system memory 592, the third communications path is not direct.

Figure 6:
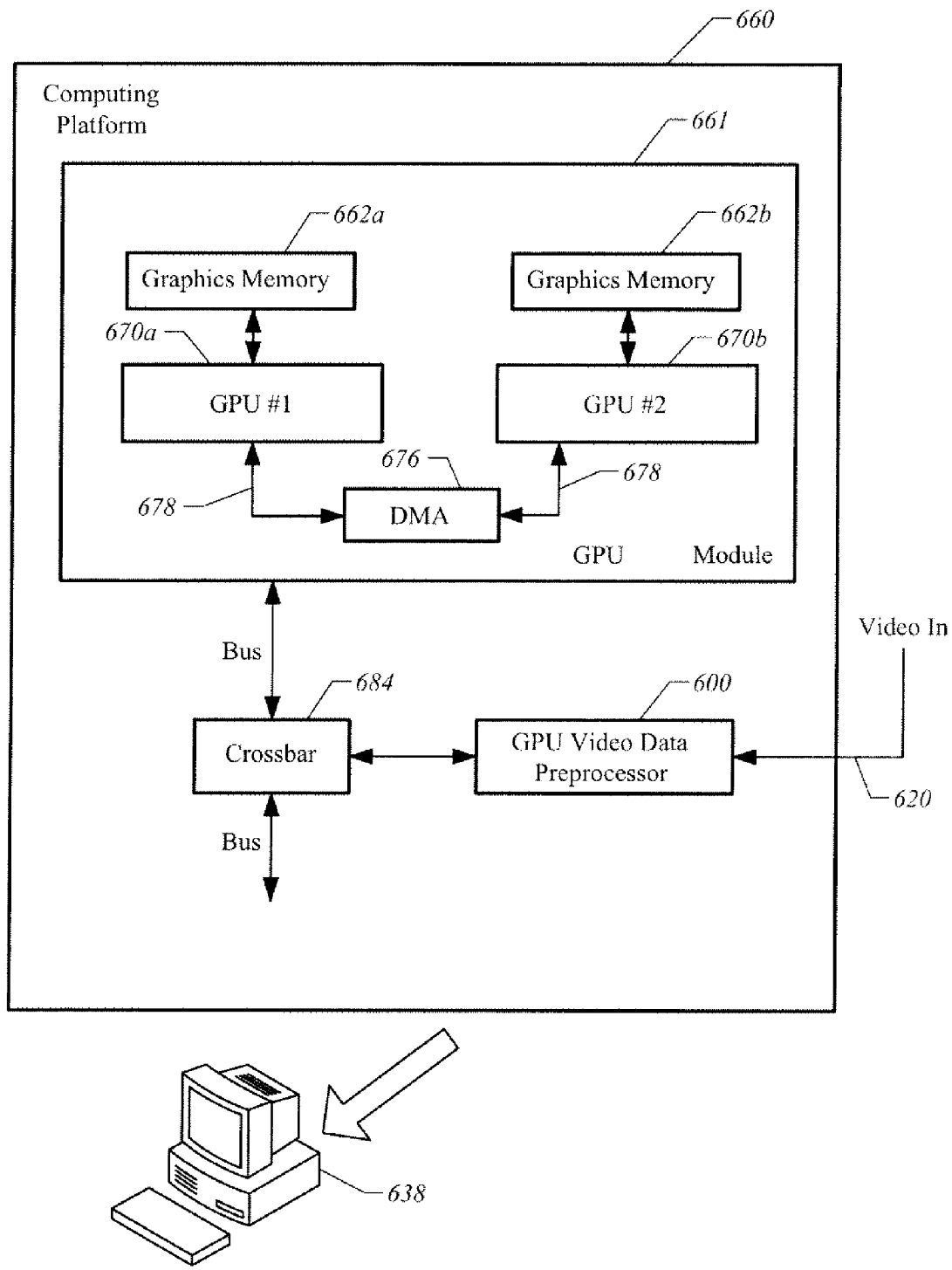
FIG. 6 depicts a GPU video data preprocessor as part of a computing platform that includes multiple GPUs, according to an embodiment of the invention.

FIG. 6 depicts a GPU video data preprocessor as part of a computing platform that includes multiple GPUs, according to an embodiment of the invention. As shown, a computing system 638 includes a commuting platform 660, which can have a GPU video data preprocessor 600 and a GPU module 661. Video data preprocessor 600 is coupled via a crossbar 684 to GPU module 661 from video input 620. GPU module 661 includes multiple GPUs 670a and 670b and multiple graphics memories 662a and 662b. GPU module 661 also includes a direct memory access ("DMA") engine 676 that can control interactions and data movement between multiple graphics memories 662a and 662b without using a CPU. Advantageously, multiple GPUs 670a and 670b can be used to modify the video data passing from GPU video data preprocessor 600, thereby increasing the graphics processing power. So multiple GPUs 670a and 670b can operate, for example, to composite images. Also, operations upon the video data can be provided by either one of multiple GPUs 670a or 670b, or both, at any time (e.g., such as in a flip-flop fashion).

In one embodiment, direct memory access engine 676 is configured to move data over buses 678 in accordance to a HyperTransport bus architecture and protocol maintained by the HyperTransport Technology Consortium. In a specific embodiment, GPU module 661 implements Scalable Link Interface ("SLI") technology developed by Nvidia of Santa Clara, Calif., in which at least two GPUs constitute multiple GPUs 670a and 670b.

Figure 7:
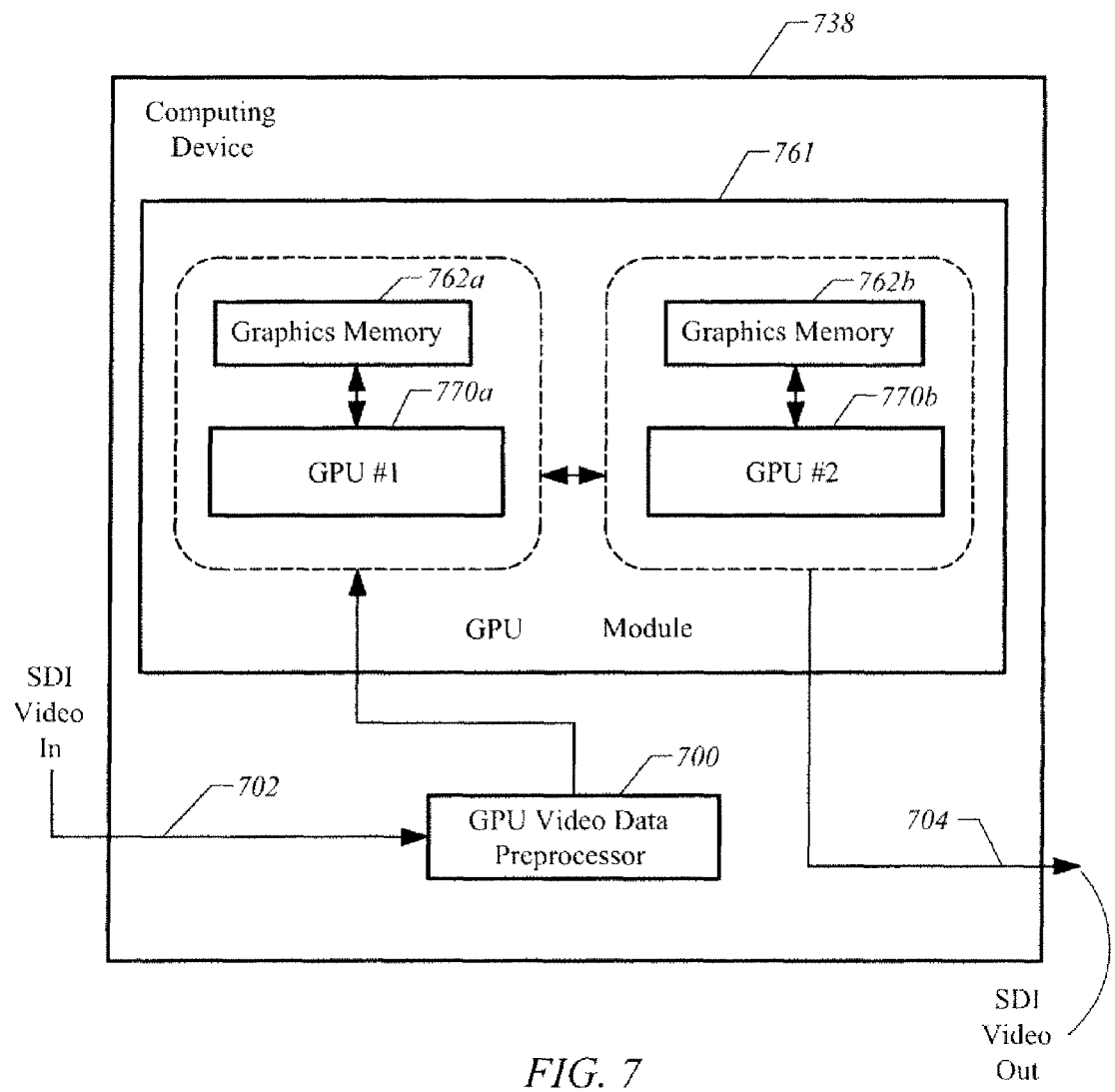
FIG. 7 depicts a GPU video data preprocessor implemented with at least two GPUs, according to an embodiment of the invention.

FIG. 7 depicts a GPU video data preprocessor implemented with at least two GPUs, according to an embodiment of the invention. Computing device 738 includes a GPU module 761 having multiple GPUs 770a and 770b and multiple graphics memories 762a and 762b. In this example, GPU video data preprocessor 700, GPU 770a and graphic memory 762a are configured to format a video data input signal 702, such as an SDI video-in signal. GPU 770 optionally can modify the video data from the SDI video-in signal. Further, GPU 770b and graphic memory 762b are configured to format a video data output signal 704, such as an SDI video out signal, for use by an external device (not shown) capable of receiving video signals in a comparable format (e.g., an SDI format). In one embodiment, GPU 770b forms a video data output signal in a manner set forth in U.S. Nonprovisional patent application Ser. No. 10/741,811, titled "Apparatus and Method for Generating Serial Digital Video Using a Graphics Processing Unit" (as amended) and filed on Dec. 18, 2003, which is hereby incorporated by reference in its entirety for all purposes.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments. Although the above descriptions of the various embodiments relate to SDI video formats, the discussion is applicable to any type of video formats requiring conversion to a format useable by a GPU.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. A graphics system, comprising:
a central processing unit (CPU) having a CPU format;
a graphics processing unit (GPU) having a graphics pipeline, the GPU having a GPU native format internal to the GPU, said GPU native format being different from said CPU format;
a graphics memory coupled to said GPU;
a graphics preprocessor external to the GPU, the graphics preprocessor having a video input to receive video data in a first format and generate as an output video data formatted in said GPU native format for transit to said GPU, said graphics preprocessor comprising
a native data formatter in the graphics preprocessor configured to format said video data as GPU data compatible with said GPU native format of said GPU such that said GPU receives video data formatted as units of data having a data size based on said GPU native format; and
a crossbar connected between said graphics preprocessor and said GPU and connected between said graphics preprocessor and said CPU, said crossbar configured to deliver data in said GPU native format for transit to said GPU, said crossbar configured to deliver data in said CPU format for transit to said CPU,
wherein said graphics system is configured to provide a first communications path from said graphics preprocessor to said GPU and passing through said crossbar, said output video data in said GPU native format being delivered to said GPU along said first communications path, and
wherein said graphics system is configured to provide a second communications path from said graphics preprocessor to said CPU and passing through said crossbar,
wherein said graphics preprocessor includes converter logic and said native data formatter is coupled to said converter logic, said converter logic being configured to perform color space conversion of said video data into a color format utilized by said GPU, which said native data formatter uses to form said GPU data.

2. The graphics system of claim 1 wherein said GPU native format of said GPU has a pixel data order, the native data formatter in said graphics preprocessor reordering pixel data into the pixel data order of the GPU native format.

3. The graphics system of claim 1, wherein said graphics preprocessor includes a command execution unit to transmit an instruction executable by said GPU to perform color correction of video data within said graphics pipeline.

4. The graphics system of claim 1 wherein said graphics preprocessor includes a command execution unit to transmit an instruction executable by said GPU to modify the processing of video data within said graphics pipeline including at least one of color correction, texture streaming, and a blit instruction.

5. The graphics system of claim 4 wherein said command execution unit further comprises:
   a subset of instructions executable by said GPU including said graphics pipeline; and
   an instruction selector configured to select one of said subset of instructions in response to a command from said CPU to modify an image composed of said GPU data.

6. The graphics system of claim 4 wherein said command execution unit conserves computational resources of said CPU that otherwise would be consumed to perform a graphic operation on said video data, and
   said transmitted instruction facilitates streaming computing on said GPU data, whereby said GPU data is modified as it streams through said graphics pipeline.

7. The graphics system of claim 1 further comprising a bus protocol transceiver configured to transmit said GPU data in accordance with a bus protocol for forming said first communications path from said graphics preprocessor to said graphics memory, wherein said first communications path excludes a system memory.

8. The graphics system of claim 7 wherein said first communications path reduces latency in storing video data in said graphics memory that otherwise accompanies transferring video data from said system memory.

9. The graphics system of claim 1 wherein said video data further comprises Serial Digital Interface ("SDI") formatted video data, and
   said GPU is a general purpose GPU ("GPGPU").

10. The graphics system of claim 1 further comprising:
    a bus connector configured to mate with a computing platform to electrically couple said graphics preprocessor to said graphics memory; and
    a circuit board upon which said graphics preprocessor is mounted, said circuit board being configured to convey signals among said bus connector, said graphics preprocessor, and said input.

11. The graphics system of claim 1 further comprising another one or more GPUs and another one or more graphic memories.

12. The graphics system of claim 11 further comprising a GPU interconnection bus configured to exchange data among said GPU and said another one or more GPUs to perform a graphics operation.

13. The graphics system of claim 12 wherein said crossbar is a bridge for bridging one or more buses of a family of PCI buses, and said GPU interconnection bus is a HyperTransport bus.

* * * * *